US011898386B1

(12) United States Patent
Mitchell et al.

(10) Patent No.: US 11,898,386 B1
(45) Date of Patent: Feb. 13, 2024

(54) DOOR STOPPING SYSTEM

(71) Applicants: Sean Mitchell, Paso Robles, CA (US); Jordan James McCaffrey, Paso Robles, CA (US); Scott Russel Dawson, Templeton, CA (US); Quenten Harold Martin Rouse, Atascadero, CA (US)

(72) Inventors: Sean Mitchell, Paso Robles, CA (US); Jordan James McCaffrey, Paso Robles, CA (US); Scott Russel Dawson, Templeton, CA (US); Quenten Harold Martin Rouse, Atascadero, CA (US)

( * ) Notice: Subject to any disclaimer, the term of this patent is extended or adjusted under 35 U.S.C. 154(b) by 0 days.

(21) Appl. No.: 17/959,988

(22) Filed: Oct. 4, 2022

Related U.S. Application Data

(60) Provisional application No. 63/252,012, filed on Oct. 4, 2021.

(51) Int. Cl.

| | |
|---|---|
| ***E05C 17/44*** | (2006.01) |
| ***E05C 19/00*** | (2006.01) |
| ***E05C 19/18*** | (2006.01) |
| ***E05C 17/04*** | (2006.01) |
| ***E05F 5/08*** | (2006.01) |

(52) U.S. Cl.
CPC .......... *E05C 17/443* (2013.01); *E05C 17/045* (2013.01); *E05C 17/44* (2013.01); *E05C 19/004* (2013.01); *E05C 19/188* (2013.01); *E05F 5/08* (2013.01); *E05C 17/446* (2013.01)

(58) Field of Classification Search
CPC ....... E05F 5/00; E05F 5/04; E05F 5/06; E05F 5/08; E05F 2005/043; E05F 2005/046; E05C 17/045; E05C 17/047; E05C 17/12; E05C 17/14; E05C 17/16; E05C 17/163; E05C 17/166; E05C 17/18; E05C 17/30; E05C 17/32; E05C 17/34; E05C 17/345; E05C 17/44; E05C 17/446; E05C 17/54; E05C 19/003; E05C 19/004; E05C 19/005; E05C 19/18; E05C 19/188; E05C 17/443
See application file for complete search history.

(56) References Cited

U.S. PATENT DOCUMENTS 318,323 A * 5/1885 Teetzel .................... E05F 5/00 292/338
384,715 A * 6/1888 Reisse .................. E05C 17/443 292/338

(Continued)

*Primary Examiner* — Jeffrey O'Brien
(74) *Attorney, Agent, or Firm* — John Rizvi; JohnRizvi,P.A.—ThePatentProfessor

(57) ABSTRACT

A door stopping system comprises a mounting member, a supporting member, a leg member, a spring member, a sleeve member, a first pin member and a second pin member. The mounting member is pivotally connected with the supporting member via the first pin member, the leg member is pivotally connected with the supporting member via the second pin member, the mounting member and the leg member are oppositely located to each other along the supporting member, the spring member is biased in between the supporting member and the leg member, and the sleeve member is slidably sleeved on the supporting member. The mounting member is configured to be removably attached to a door. The leg member is configured to contact a ground.

18 Claims, 6 Drawing Sheets

(56) References Cited

U.S. PATENT DOCUMENTS

| | | | | | |
|---|---|---|---|---|---|
| 559,382 | A * | 5/1896 | Hoffman | E05C 17/54 | 292/338 |
| 686,093 | A * | 11/1901 | Lehman | E05C 19/004 | 116/13 |
| 1,035,264 | A * | 8/1912 | Tate | E05F 11/00 | 292/342 |
| 1,681,834 | A * | 8/1928 | Arends | E05C 17/54 | 292/288 |
| 1,721,257 | A * | 7/1929 | Myers | E05C 17/443 | 292/238 |
| 1,830,296 | A * | 11/1931 | Siino | E05C 17/54 | 292/338 |
| 2,109,127 | A * | 2/1938 | Carlson | F23N 5/123 | 292/DIG. 19 |
| 2,492,032 | A * | 12/1949 | Bloomfield | E05C 17/54 | 292/342 |
| 2,626,826 | A * | 1/1953 | Dritz | E05C 17/54 | 292/343 |
| 2,798,755 | A * | 7/1957 | Zapotocny | E05C 17/54 | 16/86 A |
| 2,898,140 | A * | 8/1959 | Gislason | E05C 17/54 | 292/342 |
| 3,731,341 | A * | 5/1973 | Woodruff | E05C 19/004 | 292/297 |
| 3,737,186 | A * | 6/1973 | Chezem | E05C 17/443 | 292/338 |
| 3,809,419 | A * | 5/1974 | Chezem | E05C 17/443 | 292/210 |
| 4,163,574 | A * | 8/1979 | Chezem | E05C 19/004 | 292/338 |
| 4,421,348 | A * | 12/1983 | Kahn | E05C 19/004 | 292/339 |
| 4,456,291 | A * | 6/1984 | Brogie | E05C 19/004 | 292/338 |
| 4,514,000 | A * | 4/1985 | Chezem | E05C 19/004 | 292/338 |
| 4,641,869 | A * | 2/1987 | Johnson | E05C 19/004 | 292/339 |
| 4,673,203 | A * | 6/1987 | Chezem | E05C 17/443 | 292/338 |
| 4,805,948 | A * | 2/1989 | Renzi | E05C 17/54 | 292/342 |
| D303,625 | S * | 9/1989 | Ryser | D8/336 | |
| 5,056,836 | A * | 10/1991 | Wells | E05C 17/54 | 292/288 |
| 5,590,928 | A * | 1/1997 | Voiculescu | E05C 17/446 | 292/338 |
| 5,673,952 | A * | 10/1997 | Chezem | E05C 17/443 | 292/338 |
| 6,120,072 | A * | 9/2000 | Benedict | E05C 17/443 | 292/338 |
| 7,065,830 | B2 * | 6/2006 | Bushey | E05C 17/54 | 16/85 |
| D587,992 | S * | 3/2009 | Mackin | D8/400 | |
| 7,937,806 | B1 * | 5/2011 | Doyle | E05F 5/04 | 16/83 |
| 8,186,011 | B2 * | 5/2012 | Rooney | E05C 17/443 | 16/86 A |
| 8,276,240 | B2 * | 10/2012 | Ritachka | E05F 5/06 | 16/83 |
| 8,496,278 | B2 * | 7/2013 | Lee | E05C 19/182 | 292/339 |
| 9,163,438 | B2 * | 10/2015 | Mackay | E05C 17/54 | |
| 9,334,682 | B2 * | 5/2016 | Kaplafka, Jr. | E05C 19/004 | |
| 9,644,405 | B2 * | 5/2017 | McCann | E05C 17/446 | |
| 9,702,174 | B2 * | 7/2017 | Hatton | E05C 17/443 | |
| 10,214,948 | B2 * | 2/2019 | Richmond | E05C 5/02 | |
| 10,501,968 | B2 * | 12/2019 | Maher | E05C 17/08 | |
| 10,508,482 | B1 * | 12/2019 | Schaefer | E05C 17/443 | |
| 10,822,854 | B2 * | 11/2020 | Lee | E05C 19/188 | |
| 11,053,718 | B2 * | 7/2021 | Finley | E05C 19/003 | |
| 11,149,484 | B1 * | 10/2021 | Bouzianis | E05F 5/02 | |
| 11,473,354 | B2 * | 10/2022 | Maher | E05C 17/24 | |
| 2004/0181902 | A1 * | 9/2004 | Pierce | E05C 17/443 | 16/49 |
| 2005/0229358 | A1 * | 10/2005 | Barone | E05C 17/56 | 16/82 |
| 2007/0271731 | A1 * | 11/2007 | Fuller | E05F 5/06 | 16/82 |
| 2018/0119473 | A1 * | 5/2018 | Jensen | E05F 5/06 | |
| 2019/0330890 | A1 * | 10/2019 | Raman | E05C 19/004 | |
| 2020/0318404 | A1 * | 10/2020 | Rashed | E05C 17/44 | |

* cited by examiner

DOOR STOPPING SYSTEM

CROSS-REFERENCE TO RELATED APPLICATIONS

This application claims the benefit of U.S. Provisional Patent Application Ser. No. 63/252,012, filed on Oct. 4, 2021, which is incorporated by reference herein in its entirety.

FIELD OF THE INVENTION

The present invention relates generally to a door stopping system, and more particularly, to a portable self-deploying door stopping system.

BACKGROUND OF THE INVENTION

A door is a hinged or otherwise movable barrier that allows ingress into and egress from an enclosure. The created opening in the wall is a doorway or portal. A door's essential and primary purpose is to provide security by controlling access to the doorway (portal). Conventionally, it is a panel that fits into the portal of a building, room, or vehicle. Doors are generally made of a material suited to the door's task.

Doors are commonly attached by hinges. The door may be moved at angles away from the portal to allow or prevent ingress or egress. In most cases, a door's interior matches its exterior side. Doors may incorporate locking mechanisms to ensure that only some people can open them. Doors may have devices such as knockers or doorbells by which people outside announce their presence.

Apart from providing access into and out of a space, doors may have the secondary functions of ensuring privacy by preventing unwanted attention from outsiders, of separating areas with different functions, of allowing light to pass into and out of a space, of controlling ventilation or air drafts so that interiors may be more effectively heated or cooled, of dampening noise, and of blocking the spread of fire.

Doors may have aesthetic, symbolic, ritualistic purposes. Receiving the key to a door can signify a change in status from outsider to insider. Doors and doorways frequently appear in literature and the arts with metaphorical or allegorical import as a portent of change.

There are many kinds of doors, with different purposes. The most common type is the single-leaf door, which consists of a single rigid panel that fills the doorway. Most doors are hinged along one side to allow the door to pivot away from the doorway in one direction, but not the other. The axis of rotation is usually vertical. Doors can be hinged so that the axis of rotation is not in the plane of the door to reduce the space required on the side to which the door opens. This requires a mechanism so that the axis of rotation is on the side other than that in which the door opens. A swing door has special single-action hinges that allow it to open either outward or inward, and is usually sprung to keep it closed.

A doorstop (also door stopper, door stop or door wedge) is an object or device used to hold a door open or closed, or to prevent a door from opening too widely. A door may be stopped by a doorstop which is simply a heavy solid object, such as a rubber, placed in the path of the door. These stops are predominantly improvised. Historically, lead bricks have been popular choices when available. However, as the toxic nature of lead has been revealed, this use has been strongly discouraged. Another method is to use a doorstop which is a small wedge of wood, rubber, fabric, plastic, cotton or another material. Manufactured wedges of these materials are commonly available. The wedge is kicked into position and the downward force of the door, now jammed upwards onto the doorstop, provides enough static friction to keep it motionless.

Another type of doorstop is used to prevent doors from opening too far and damaging nearby walls. In this case a rubber cylinder or dome—or a rod or block of rubber-tipped metal, wood or plastic—is screwed into the wall, molding or the floor in the path of the door. If it is attached to the wall, it may be either a few inches above the ground, or at such a height as to meet the doorknob. A short, wall-attached doorstop, usually a rubber dome or cylinder, is sometimes called a wall bumper.

However, every single product in the market is either impractical or requires that somebody once the door is breached somehow place an object to block and hold the door.

Accordingly, there is need for a solution to at least one of the aforementioned problems.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention is directed to a door stopping system.

In an embodiment of the present invention, the door stopping system comprises a mounting member, a supporting member, a leg member, a spring member, a sleeve member, a first pin member and a second pin member.

In this embodiment of the present invention, the mounting member is pivotally connected with the supporting member via the first pin member, the leg member is pivotally connected with the supporting member via the second pin member, the mounting member and the leg member are oppositely located to each other along the supporting member, the spring member is biased in between the supporting member and the leg member, and the sleeve member is slidably sleeved on the supporting member.

In this embodiment of the present invention, the mounting member is configured to be removably attached to a door.

In this embodiment of the present invention, the leg member is configured to contact a ground.

In this embodiment of the present invention, the leg member is selectively positioned in a folding configuration, a partially unfolding configuration and a fully unfolding configuration.

In a first aspect of this embodiment of the present invention, when the leg member is positioned in the folding configuration, the leg member is accommodated within the supporting member, and the sleeve member is slidably sleeved on the leg member and the supporting member and is able to freely slide on the leg member and the supporting member.

In a second aspect of this embodiment of the present invention, when the leg member is positioned in the partially unfolding configuration, the leg member extends away from and is obliquely oriented to the supporting member, the leg member is able to swing about the supporting member, and the leg member laterally traverses out of and is able to contact against the sleeve member.

In a third aspect of this embodiment of the present invention, when the leg member is positioned in the fully unfolding configuration, the leg member extends away from and is parallelly oriented to the supporting member, and the leg member axially traverses into and is constrained by the sleeve member.

In this embodiment of the present invention, the mounting member comprises a mounting plate, a pivoting base, a limiting plate and a buffer, the pivoting base is connected in between the mounting plate and the limiting plate, the mounting plate and the limiting plate are obliquely oriented to each other, the mounting plate is configured to be removably attached to the door via any fastening means such as an adhesive pad or screws or a specialized double sided tape, the first pin member laterally penetrates the pivoting base, an acute angle is formed in between the mounting plate and the limiting plate adjacent to the pivoting base, the buffer is disposed on the limiting plate, and the buffer is located in between the mounting plate and the limiting plate.

In this embodiment of the present invention, the supporting member comprises an elongated rectangular supporting section and a slot, the sleeve member, preferably of a rectangular shape, is slidably sleeved on the elongated rectangular supporting section, the slot laterally traverses into and axially traverses through the elongated rectangular supporting section so as to accommodate the leg member, the elongated rectangular supporting section comprises a first supporting end and a second supporting end, the first supporting end and the second supporting end are oppositely located to each other, the first pin member laterally penetrates the first supporting end, the second pin member laterally penetrates the second supporting end, the first supporting end is pivotally connected with the pivoting base via the first pin member, and the elongated rectangular supporting section is able to swing in between the mounting plate and the limiting plate at a maximum swing angle which is equal to the acute angle. In one embodiment, the elongated rectangular supporting section has two longitudinal sides thereto which have a width distance therebetween that is commensurate with the width of the mounting member, preferably from about 3 to 8 inches, more preferably from about 4 to 6 inches in width. The longitudinal sides of the elongated rectangular supporting section are spaced apart sufficiently to accommodate the leg member therein when the leg member is rotated around the second pin member into one side of the elongated rectangular supporting section. Preferably one side of the elongated rectangular supporting section is an empty space to accommodate the leg member as described herein above. The sleeve can be wide enough to fit over the sides of the elongated rectangular supporting section and move along the sides thereof towards the first supporting end to permit the leg member to rotate and fit in the space as noted.

In this embodiment of the present invention, the leg member comprises an elongated inwardly angled shaft on each longitudinal side of the leg member, which angle into and out of (e.g., by an angle of from 20-45 degrees, preferably from 30 degrees to 40 degrees) a narrower width of the leg member as the leg member progresses from the second pin member location to the portion of the leg member which contact a ground, a length of each of the elongated shafts which have an inwardly and then outwardly angled section is less than a length of the elongated rectangular supporting section, the elongated shafts comprising a first end and a second end, the first end and the second end of each are oppositely located to each other, the second end is configured to contact the ground, the second pin member laterally penetrates the first end through the shafts, the first end is pivotally connected with the second supporting end via the second pin member, and the spring member is disposed on the second pin member and is biased in between the first end and the second supporting end so as to drive the leg member from being positioned in the folding configuration, to the partially unfolding configuration and eventually to the fully unfolding configuration.

The width of the leg member can generally be less than the width of the supporting member, and narrows by the aforementioned angling in and out, and then returns to the same previous width, as the length of the leg member proceeds from the second pin to the portion touching a ground. The portion touching a ground can have thereover a foot wedge member which can be of any suitable plastic or rubber material and which can be of a size slightly smaller than the width of the ground touching portion of the leg portion, preferably about 4 to 8 inches, more preferably from about 5 to 6 inches, while the bottom of the width of the leg portion can be from about 5 to 8 inches, preferably about 6 to 7 inches in width.

In this embodiment of the present invention, for example, the spring member is a wire torsion spring sleeved on the second pin member.

In this embodiment of the present invention, the sleeve member comprises a sleeve body, a channel, a first lateral hole and a pair of second lateral holes, the sleeve body comprises a first sleeve end and a second sleeve end, the first sleeve end and the second sleeve end are oppositely located to each other, the channel axially traverses through the sleeve body, the first lateral hole axially traverses into the sleeve body from the first sleeve end and laterally traverses into the sleeve body, the pair of second lateral holes axially traverse into the sleeve body from the second sleeve end and laterally traverse into the sleeve body, the pair of second lateral holes are oppositely located to each other, the first lateral hole is located in between the pair of second lateral holes, and the elongated rectangular supporting section is inserted into the channel such that the sleeve body is slidably sleeved on the elongated rectangular supporting section.

In the first aspect of this embodiment of the present invention, when the leg member is positioned in the folding configuration, the elongated shaft is accommodated within the slot, the second end is adjacently located to the first supporting end, the sleeve body is sleeved on the elongated shaft and the elongated supporting shaft, the second pin member is inserted into the pair of second lateral holes, the sleeve body rests against the second pin member, and the spring member is compressed in between the elongated shaft and the elongated rectangular supporting section.

In the second aspect of this embodiment of the present invention, when the leg member is positioned from the folding configuration to the partially unfolding configuration, the elongated shafts of the leg member extends away from and is obliquely oriented to the side walls of the elongated rectangular supporting section via the spring member, and the elongated shafts of the leg member swings about the elongated supporting shaft such that the second end moves away from the first supporting end and the elongated shaft laterally extends out of the first lateral hole and rests against the sleeve body.

In the third aspect of this embodiment of the present invention, when the leg member is positioned in the fully unfolding configuration, the elongated shafts of the leg member extend away from and is parallelly oriented to the elongated rectangular supporting section, the first supporting end, the second supporting end, the first end and the second end are serially in an align arrangement, the sleeve body is sleeved on the elongated shafts and the elongated rectangular supporting section and rests against the second pin member so as to constrain the elongated shafts, and the elongated rectangular supporting section contacts against the limiting plate via the buffer.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

These and other objects, features, and advantages of the present invention will become more readily apparent from the attached drawings and the detailed description of the preferred embodiments, which follow.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

The preferred embodiments of the invention will hereinafter be described in conjunction with the appended drawings provided to illustrate and not to limit the invention, where like designations denote like elements, and in which:

Figure 1:
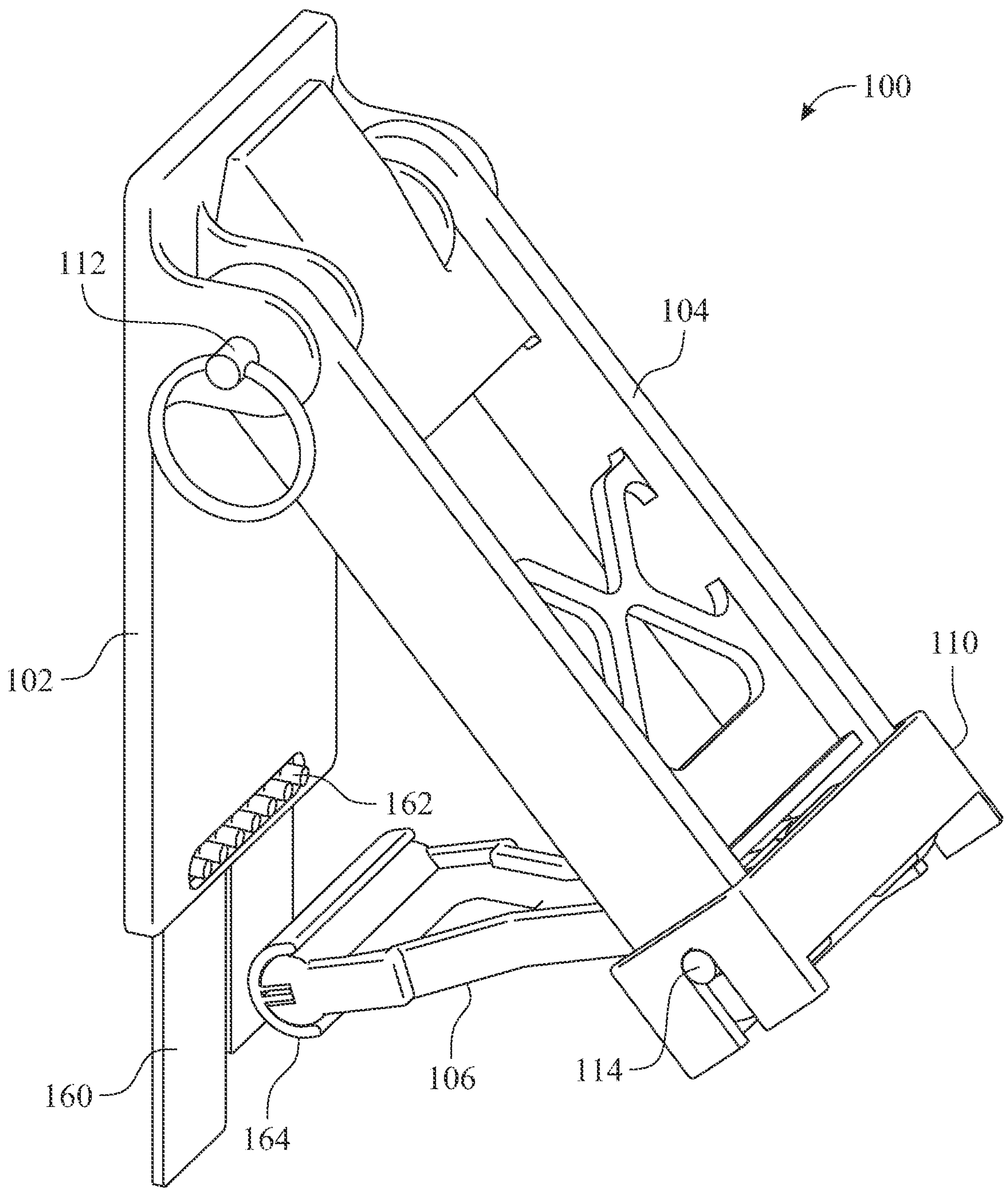
Figure 2:
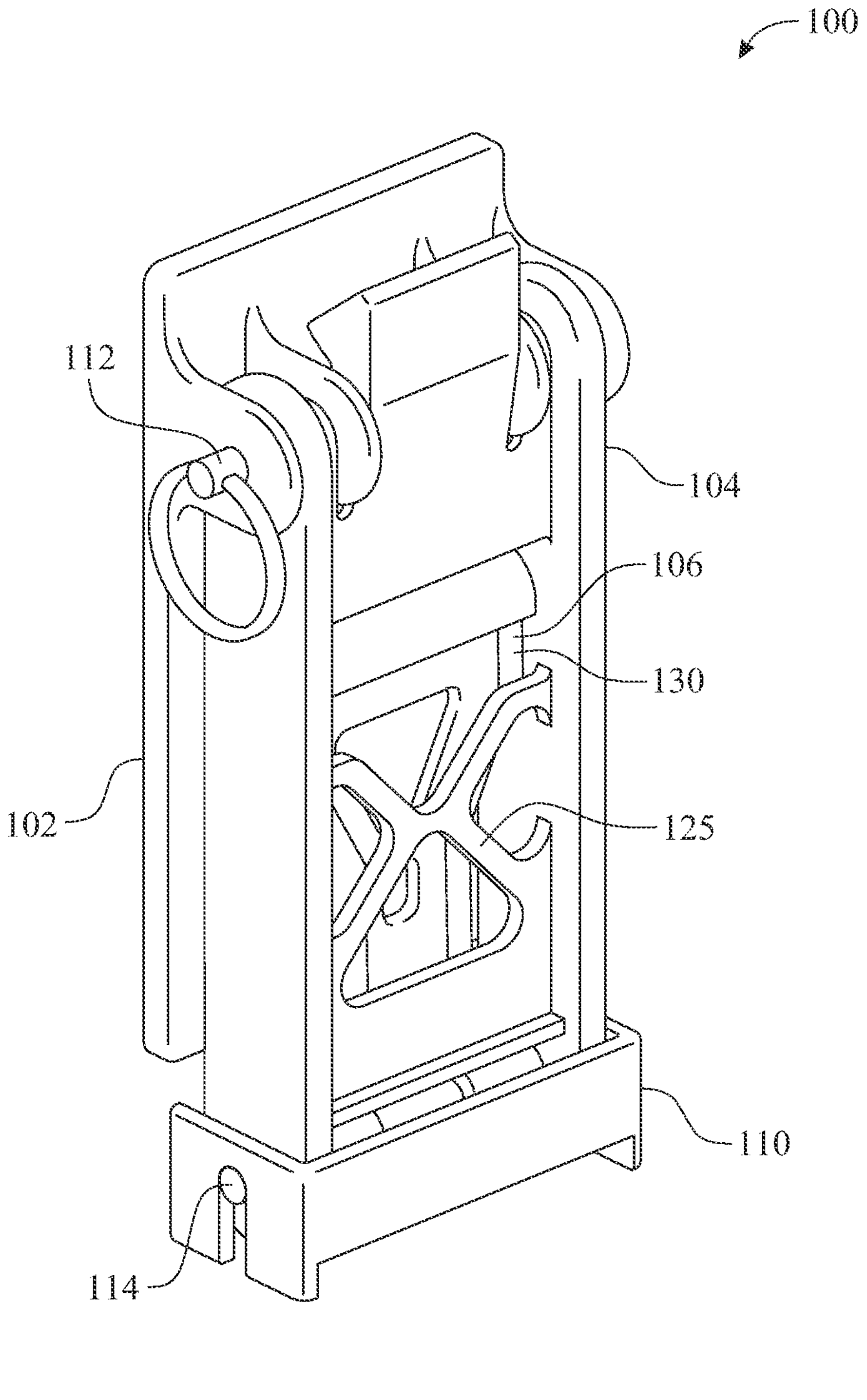
Figure 3:
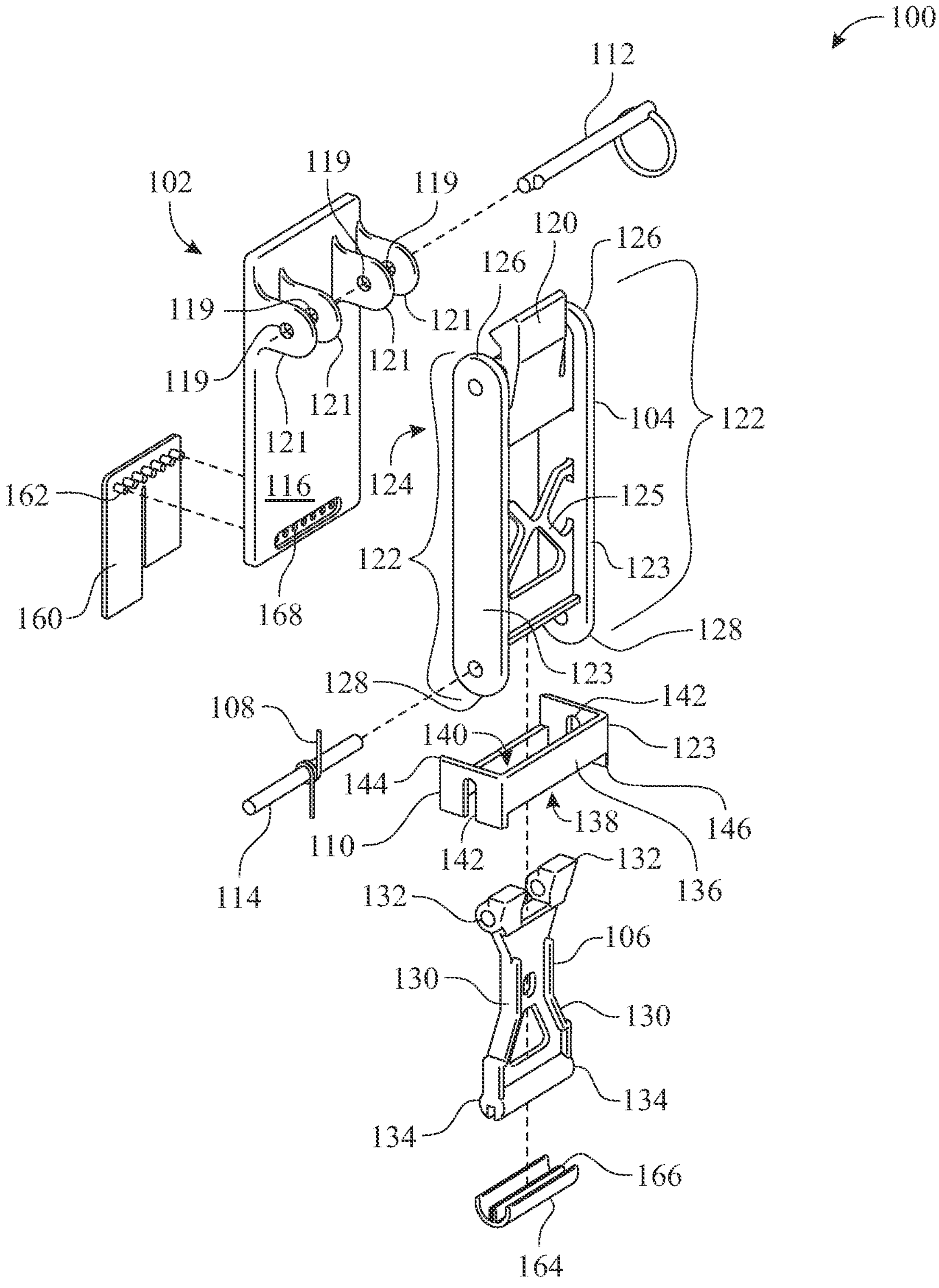
Figure 4:
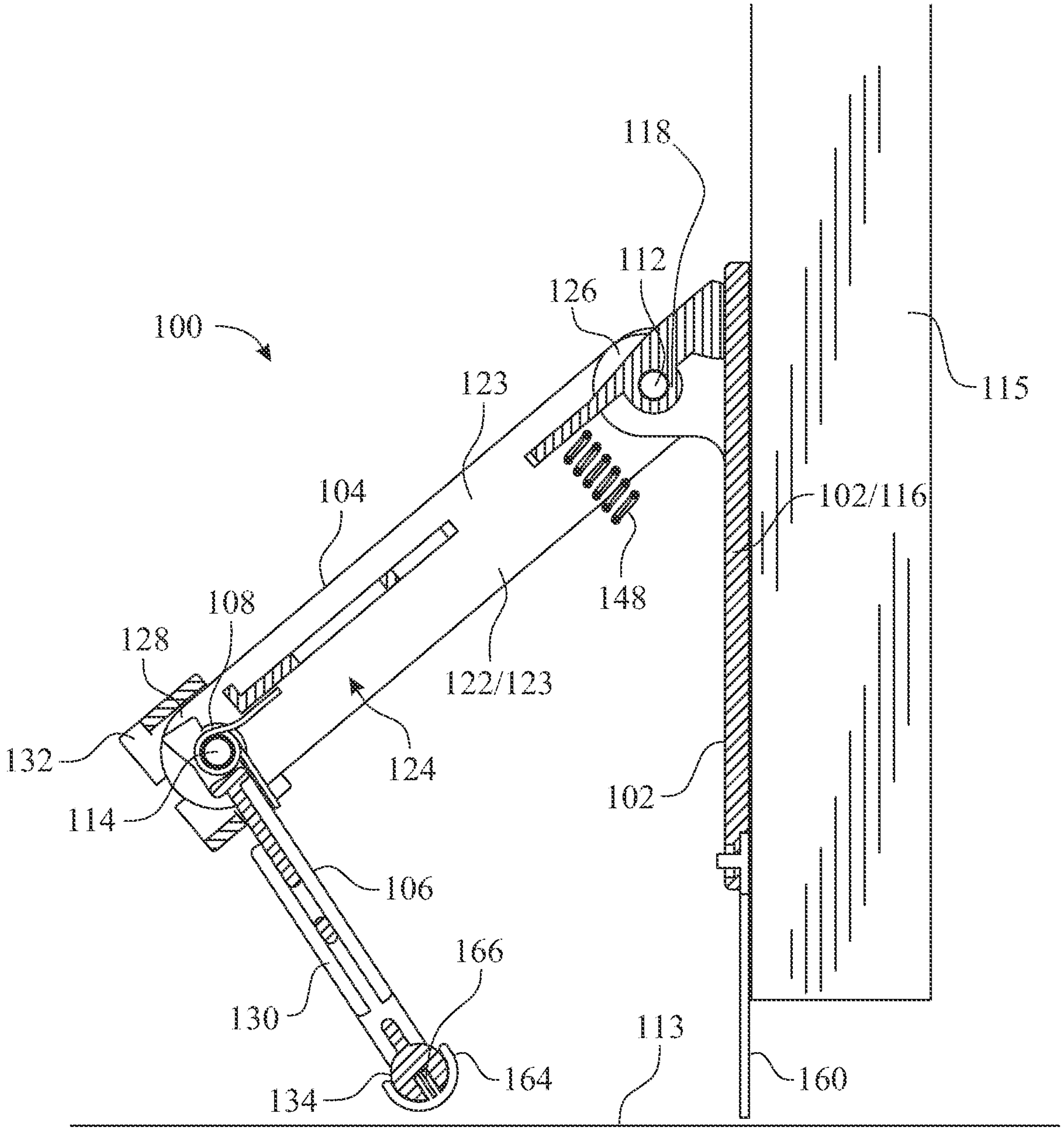
Figure 5:
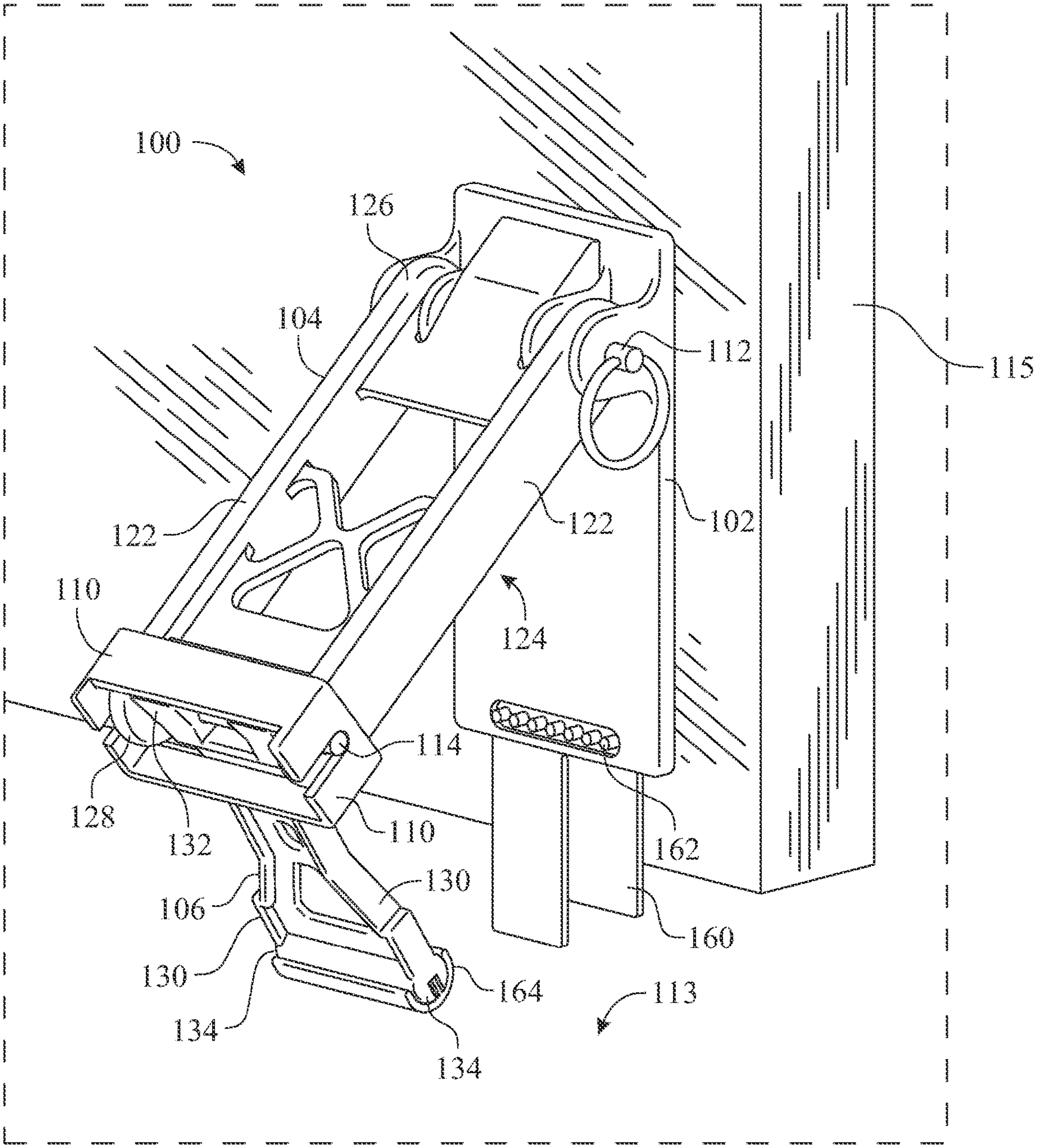
Figure 6:
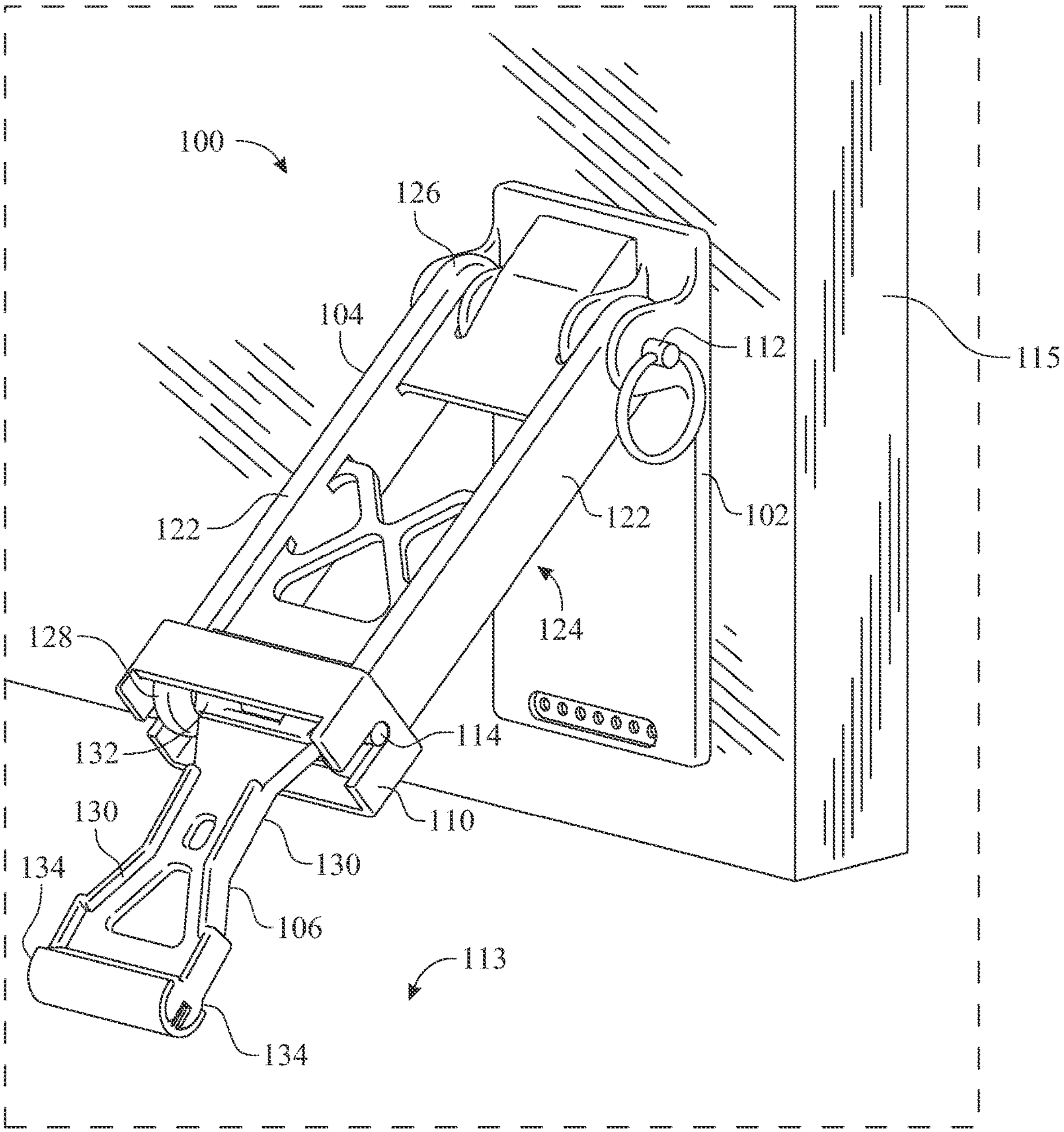

FIG. 1 presents a side perspective view of a door stopping system of the present invention in the partially folded position;

FIG. 2 presents a perspective view of the door stopping system of the present invention in the fully folded position;

FIG. 3 presents an exploded view of the door stopping system of the present invention;

FIG. 4 presents a cut away side view of the door stopping system of the present invention in a partially folded position and attached to a door;

FIG. 5 presents a front perspective view of the door stopping system of the present invention in a partially folded position and attached to a door; and, FIG. 6 presents a perspective view showing that the door stopping system of the present invention in a fully extended position and attached to a door.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

Shown throughout the figures, the present invention is directed toward a portable self-deploying door stopping system 100.

Referring initially to FIGS. 1-6, in an embodiment of the present invention, the door stopping system 100 comprises a mounting member 102, a supporting member 104, a leg member 106, a spring member 108, a sleeve member 110, a first pin member 112 and a second pin member 114.

In this embodiment of the present invention, the mounting member 102 is pivotally connected with the supporting member 104 via the first pin member 112, the leg member 106 is pivotally connected with the supporting member 104 via the second pin member 114, the mounting member 102 and the leg member 106 are oppositely located to each other along the supporting member 104, the spring member 108 is biased in between the supporting member 104 and the leg member 106, and the sleeve member 110 is slidably sleeved on the supporting member 104.

In this embodiment of the present invention, and referring to FIGS. 4-6, the mounting member 102 is configured to be removably attached to a door 115, either on the inside or the outside of the door.

In this embodiment of the present invention, the leg member 106 is configured to contact a ground 113.

In this embodiment of the present invention, as shown in FIGS. 1, 2 and 4-6, the leg member 106 is selectively positioned in a folding configuration, a partially unfolding configuration and a fully unfolding configuration.

In a first aspect of this embodiment of the present invention, as shown in FIG. 2, when the leg member 106 is positioned in the folding configuration, the leg member 106 is accommodated within the supporting member 104, and the sleeve member 110 is slidably sleeved on the leg member 106 and the supporting member 104 and is able to freely slide on the leg member 106 and the supporting member 104.

In a second aspect of this embodiment of the present invention, as shown in FIGS. 4 and 5, when the leg member 106 is positioned in the partially unfolding configuration, the leg member 106 extends away from and is obliquely oriented to the supporting member 104, the leg member 106 is able to swing about the supporting member 104, and the leg member 106 laterally traverses out of and is able to contact against the sleeve member 110.

In a third aspect of this embodiment of the present invention, as shown in FIG. 6, when the leg member 106 is positioned in the fully unfolding configuration, the leg member 106 extends away from and is parallelly oriented to the supporting member 104, and the leg member 106 axially traverses into and is constrained by the sleeve member 110.

In one embodiment of the present invention as shown in FIG. 3, the mounting member 102 comprises a mounting plate 116, a pivoting base 118, a limiting plate 120 and a buffer 148, the pivoting base 118 is connected in between the mounting plate 116 and the limiting plate 120, the mounting plate 116 and the limiting plate 120 are obliquely oriented to each other, the mounting plate 116 is configured to be removably attached to the door via any fastening means such as an adhesive pad or screws, the first pin member 112 laterally penetrates the pivoting base 118 through holes 119 which are located in protrusions 121, which extend in a direction perpendicular to the mounting plate 116, the protrusions 121 and the holes being configured to permit the first pin member 112 to pass therethrough, such that an acute angle is formed in between the mounting plate 116 and the limiting plate 120 adjacent to the pivoting base 118, the buffer 148 (see FIG. 4.) is disposed on the limiting plate 120, and the buffer 148 is located in between the mounting plate 116 and the limiting plate 120. The mounting plate 116 has connected thereto a placement gauge 160 which can be used to determine how far off the floor/ground 113 to place the door stopping system 100. The placement gauge 160 is connected to the mounting plate 116 by mini-protrusions 162 on an end of the placement gauge 160, which mini-protrusions 162 pass through apertures 168 found on the mounting plate 116, the same being connected by force fit or any other connection means. Connected to the bottom of the elongated shafts 130 of the leg 106 is a foot wedge 164 which is curved and semicircular in shape and which has rubber connection posts 166 in the interior of the foot wedge 164 which can be force fit over the second ends 134 of the shafts 130 of the leg 106. The foot wedge 164 can be made of any thermoplastic material as can the entire door stopping system 100 and all of its components described herein. A preferable thermoplastic material can be extruded and/or injection molded polymers such as are known in the art. The rubber wedge can be made of a rubber material such as natural rubber, synthetic rubber, EPDM, PVC, and the like in order to provide the foot wedge 164 with a surface of sufficient friction to keep the system 100 in place and the door open as necessary.

In this embodiment of the present invention and referring to FIGS. 3 and 4, the supporting member 104 comprises elongated rectangular supporting section 122 comprised of two sides 123 connected by cross connections 125 and a slot 124 for receiving the section 106, the sleeve member 110 is slidably sleeved on the sides 123 of elongated rectangular supporting section 122, the slot 124 laterally traverses into and axially traverses through the elongated rectangular supporting section 122 so as to accommodate the leg member 106, the elongated rectangular supporting section 122 comprises a first supporting end(s) 126 and a second supporting end(s) 128, the first supporting end(s) 126 and the second supporting end(s) 128 are oppositely located to each other, the first pin member 112 laterally penetrates the first supporting ends 126, the second pin member 114 laterally penetrates the second supporting ends 128, the first supporting ends 126 are pivotally connected with the pivoting base 118 via the first pin member 112, and elongated rectangular supporting section 122 is able to swing in between the mounting plate 116 and the limiting plate 120 at a maximum swing angle which is equal to the acute angle.

In this embodiment of the present invention and referring to FIGS. 3-6, the leg member 106 comprises two elongated shafts 130, i.e., an elongated inwardly and then outwardly angled shaft 130 on each longitudinal side of the leg member 106, as described herein above, a length of each of the elongated shafts 130 is the same as each other and is less than a length of the elongated rectangular supporting section 122, the elongated shafts 130 each comprising a first end 132 and a second end 134, the first end 132 and the second end 134 are oppositely located to each other, each second end 134 is configured to contact the ground 113, the second pin member 114 laterally penetrates both first ends 132, the first ends 132 being pivotally connected with the second supporting ends 128 via the second pin member 114, and the spring member 108 is disposed on the second pin member 114 and is biased in between the first end 132 and the second supporting end 128 so as to drive the leg member 106 from being positioned in the folding configuration inbetween the sides 123 of the supporting member 104/122, to the partially unfolding configuration and eventually to the fully unfolding configuration.

In this embodiment of the present invention, for example, the spring member 108 is a wire torsion spring sleeved on the second pin member 114.

In this embodiment of the present invention and regarding FIG. 3, the sleeve member 110 can be preferably rectangular, and can comprises a sleeve body 136, a channel 138, a first lateral hole 140 and a pair of second lateral holes 142, the sleeve body 136 comprises a first sleeve end 144 and a second sleeve end 146, the first sleeve end 144 and the second sleeve end 146 are oppositely located to each other, the channel 138 axially traverses through the sleeve body 136, the first lateral hole 140 axially traverses into the sleeve body 136 from the first sleeve end 144 and laterally traverses into the sleeve body 136, the pair of second lateral holes 142 axially traverse into the sleeve body 136 from the second sleeve end 146 and laterally traverse into the sleeve body 136, the pair of second lateral holes 142 are oppositely located to each other, the first lateral hole 140 is located in between the pair of second lateral holes 142, and the elongated rectangular supporting section 122 is inserted into the channel 138 such that the sleeve body 136 is slidably sleeved on the elongated rectangular supporting section 122. The sleeve member 110 can fit over rectangular supporting section 122 by sliding the body 136 over the, end 128 of elongated rectangular supporting section 122.

In the first aspect of this embodiment of the present invention, as shown in FIG. 2, when the leg member 106 is positioned in the folding configuration, the elongated shafts 130 of the leg member 106 and a cross connection 125 therebetween are accommodated within the slot 124, the second ends 134 are adjacently located to the first supporting ends 126, the sleeve body 136 is sleeved on the elongated shafts 130 and the elongated rectangular supporting section 122, the second pin member 114 is inserted into the pair of second lateral holes 142, the sleeve body 136 rests against the second pin member 114, and the spring member 108 is compressed in between the elongated shaft 130 and the elongated supporting shaft 122.

In the second aspect of this embodiment of the present invention, as shown in FIGS. 1, 4 and 5, when the leg member 106 is positioned from the folding configuration to the partially unfolding configuration, the elongated shafts 130 extend away from and are obliquely oriented to the elongated rectangular supporting section 122 via the spring member 108, and the elongated shafts 130 swing about the elongated rectangular supporting section 122 such that the second ends 134 move away from the first supporting ends 126 and the elongated shafts 130 laterally extends out of the first lateral hole 140 and rests against the sleeve body 136.

In the third aspect of this embodiment of the present invention, as shown in FIG. 6, when the leg member 106 is positioned in the fully unfolding configuration, the elongated shafts 130 extend away from and are parallelly oriented to the elongated rectangular supporting section 122, the first supporting end 126, the second supporting end 128, the first end 132 and the second end 134 are serially in an align arrangement, the sleeve body 136 is sleeved on the elongated shafts 130 and the elongated rectangular supporting section 122 and rests against the second pin member 114 so as to constrain the elongated shafts 130, and the elongated rectangular supporting section 122 contacts against the limiting plate 120 via the buffer 148.

Accordingly, when the leg member 106 is positioned in the fully unfolding configuration, the door stopping system will lock the position of the door. The door stopping system can be attached to a door for use in police breaching applications or for law enforcement. The door stopping system is suitable for both inward and outward opening doors. When the door is opened, the second end 134 of the leg member 106 that contacts and grips the ground or the floor provides friction so as to hold the door open when the door is moved from an open towards a closed position. The door stopping system prevents a door which has been kicked in from swinging back into the doorway. For example, the police officers do not have to worry about the door bouncing back and that way the police officers can just focus on the situation itself. It will decrease danger and increase police efficiency and will save lives.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A door stopping system comprising:

a mounting member, wherein the mounting member is configured to be removably attached to a door;

a supporting member;

a leg member, wherein the leg member is configured to contact a ground;

a spring member;

a sleeve member;

a first pin member;

a second pin member;

the mounting member being pivotally connected with the supporting member via the first pin member;

the leg member being pivotally connected with the supporting member via the second pin member;

the mounting member and the leg member being oppositely located to each other along the supporting member;

the spring member being biased in between the supporting member and the leg member; and the sleeve member being slidably sleeved on the supporting member;

wherein the leg member is selectively positioned in a folding configuration, a partially unfolding configuration and a fully unfolding configuration;

wherein the mounting member comprises a mounting plate, a pivoting base, a limiting plate and a buffer, and the pivoting base is connected in between the mounting plate and the limiting plate, the mounting plate and the limiting plate are obliquely oriented to each other and the mounting plate is configured to be removably attached to the door via a fastening means comprising an adhesive pad, screws, or double-sided tape.

2. The door stopping system of claim 1, wherein when the leg member is positioned in the folding configuration, the leg member is accommodated within the supporting member, and the sleeve member is slidably sleeved on the leg member and the supporting member and is able to freely slide on the leg member and the supporting member.

3. The door stopping system of claim 1, wherein when the leg member is positioned in the partially unfolding configuration, the leg member extends away from and is obliquely oriented to the supporting member, the leg member is able to swing about the supporting member, and the leg member laterally traverses out of and is able to contact against the sleeve member.

4. The door stopping system of claim 1, wherein when the leg member is positioned in the fully unfolding configuration, the leg member extends away from and is parallelly oriented to the supporting member, and the leg member axially traverses into and is constrained by the sleeve member.

5. The door stopping system of claim 1, wherein the first pin member laterally penetrates the pivoting base, an acute angle is formed in between the mounting plate and the limiting plate adjacent to the pivoting base, the buffer is disposed on the limiting plate, and the buffer is located in between the mounting plate and the limiting plate.

6. The door stopping system of claim 1, wherein the supporting member comprises an elongated rectangular supporting section and a slot, the sleeve member, is slidably sleeved on the elongated rectangular supporting section, the slot laterally traverses into and axially traverses through the elongated rectangular supporting section so as to accommodate the leg member, the elongated rectangular supporting section comprises a first supporting end and a second supporting end, the first supporting end and the second supporting end are oppositely located to each other, the first pin member laterally penetrates the first supporting end, the second pin member laterally penetrates the second supporting end, the first supporting end is pivotally connected with the pivoting base via the first pin member.

7. The door stopping system of claim 1, wherein the supporting member comprises an elongated rectangular supporting section which has two longitudinal sides thereto which have a width distance therebetween that is commensurate with the width of the mounting member.

8. The door stopping system of claim 1, wherein the spring member is a wire torsion spring sleeved on the second pin member.

9. The door stopping system of claim 1, wherein the leg member comprises an elongated inwardly angled shaft on each longitudinal side of the leg member, which angle into and out of a narrower width of the leg member as the leg member progresses from the second pin member location to a portion of the leg member which contacts the ground.

10. The door stopping system of claim 9, wherein the angling in and out of the narrower width occurs by two angles from 20 degrees to 45 degrees.

11. The door stopping system of claim 1, wherein a portion of the leg member touching the ground comprises a foot wedge member.

12. The door stopping system of claim 6, wherein the sleeve member comprises a sleeve body, a channel, a first lateral hole and a pair of second lateral holes, the sleeve body comprises a first sleeve end and a second sleeve end, the first sleeve end and the second sleeve end are oppositely located to each other, the channel axially traverses through the sleeve body, the first lateral hole axially traverses into the sleeve body from the first sleeve end and laterally traverses into the sleeve body, the pair of second lateral holes axially traverse into the sleeve body from the second sleeve end and laterally traverse into the sleeve body, the pair of second lateral holes are oppositely located to each other, the first lateral hole is located in between the pair of second lateral holes, and the elongated rectangular supporting section is inserted into the channel such that the sleeve body is slidably sleeved on the elongated rectangular supporting section.

13. The door stopping system of claim 12, wherein when the leg member is positioned in the folding configuration, the elongated rectangular supporting section is accommodated within the slot, a first legend is located adjacent to the second supporting end, a second leg end is located adjacent to the first supporting end, the sleeve body is sleeved on an elongated shaft of the leg member and the elongated rectangular supporting section, the second pin member is inserted into the pair of second lateral holes, the sleeve body rests against the second pin member, and the spring member is compressed in between the elongated shaft of the leg member and the elongated rectangular supporting section.

14. The door stopping system of claim 13, when the leg member is positioned from the folding configuration to the partially unfolding configuration, the elongated shaft of the leg member extends away from and is obliquely oriented to side walls of the elongated rectangular supporting section via the spring member, and the elongated shaft of the leg member swings about the rectangular supporting section such that the second leg end moves away from the first supporting end and the elongated shaft of the leg member laterally extends out of the first lateral hole and rests against the sleeve body.

15. The door stopping system of claim 13 when the leg member is positioned in the fully unfolding configuration, the elongated shaft of the leg member extends away from and is parallelly oriented to the elongated rectangular supporting section, the first supporting end, the second supporting end, the first leg end and the second leg end are serially in an aligned arrangement, the sleeve body is sleeved on the elongated shaft and the elongated rectangular supporting section and rests against the second pin member so as to constrain the elongated shaft, and the elongated rectangular supporting section contacts against the limiting plate via the buffer.

16. The door stopping system of claim 1, further comprising a placement gauge.

17. The door stopping system of claim 1, further comprising wherein the supporting member and the leg member have a width that is from 20% less than a width of the mounting member to the same width as the mounting member.

18. The door stopping system of claim 1, wherein the sleeve member comprises a sleeve body having a width that is from 20% less than a width of the mounting member to the same width as the mounting member.

* * * * *